United States Patent [19]
Brock et al.

[11] Patent Number: 5,439,083
[45] Date of Patent: Aug. 8, 1995

[54] CLUTCH

[75] Inventors: Richard L. Brock; Tony Abernethy, both of Wichita Falls, Tex.

[73] Assignee: W. P. T. Power Transmission Corporation, Wichita Falls, Tex.

[21] Appl. No.: 228,409

[22] Filed: Apr. 15, 1994

[51] Int. Cl.[6] .................. F16D 13/52; F16D 13/70
[52] U.S. Cl. .................. 192/70.2; 192/70.28; 192/88 A
[58] Field of Search ............ 192/70.2, 70.28, 70.13, 192/88 A

[56] References Cited

U.S. PATENT DOCUMENTS

| | | | |
|---|---|---|---|
| 574,269 | 12/1986 | Richards . | |
| 1,847,355 | 3/1932 | Musham | 192/88 A |
| 2,141,645 | 12/1938 | Fawick . | |
| 2,251,443 | 8/1941 | Fawick . | |
| 2,370,360 | 2/1945 | McLean et al. . | |
| 2,395,239 | 2/1946 | White et al. . | |
| 2,408,327 | 9/1946 | McLean . | |
| 2,473,646 | 6/1949 | Hollerith . | |
| 2,524,311 | 10/1950 | Fieux | 192/70.2 X |
| 2,887,202 | 5/1959 | Wilson . | |
| 2,940,572 | 6/1960 | Warman, Jr. | 192/88 A X |
| 3,002,597 | 10/1961 | Warman, Jr. et al. . | |
| 3,175,664 | 3/1965 | Ramsel | 192/70.28 |
| 3,258,369 | 6/1966 | Blaich . | |
| 3,291,273 | 12/1966 | Hansen | 192/70.2 X |
| 3,362,302 | 1/1968 | Friedman . | |
| 3,373,972 | 3/1968 | Peterson | 192/88 A X |
| 3,435,936 | 4/1969 | Warman | 192/88 A X |
| 3,480,115 | 11/1969 | Lallemant | 192/70.2 X |
| 3,537,556 | 11/1970 | Pfeffer et al. | 192/70.28 |
| 3,695,407 | 10/1972 | Peery | 192/70.28 X |
| 3,698,961 | 10/1972 | Niemann . | |
| 3,862,678 | 1/1975 | Collins | 192/88 A |
| 4,362,227 | 12/1982 | Walton et al. | 192/70.28 |
| 4,450,943 | 5/1984 | Long, Jr. | 192/70.2 |
| 4,497,398 | 2/1985 | Patel . | |
| 4,512,450 | 4/1985 | Babcock . | |
| 4,746,381 | 5/1988 | Parker et al. . | |
| 5,031,739 | 7/1991 | Flotow et al. . | |
| 5,158,511 | 10/1992 | Mungo . | |
| 5,280,829 | 1/1994 | Forsythe . | |

*Primary Examiner*—Andrea L. Pitts
*Attorney, Agent, or Firm*—Crutsinger & Booth

[57] ABSTRACT

A pneumatic air clutch assembly comprises: a hub having a flange and a cylindrical wall, a plurality of longitudinally extending teeth which project outwardly from the cylindrical wall, a longitudinally extending passage in the hub for receiving a shaft, and a plurality of driver plates slideably disposed on the teeth and biased in a spaced relationship. A driving ring includes a second plurality of teeth on which a plurality of spaced circular friction plates are slideably disposed and positioned between the driver plates. A holding plate is superposed over the driver plates at the distal end of the hub to capture the driver plates and friction plates and secured to the hub by fasteners. A pressure plate is interposed between the holding plate and the driver plates, and an inflatable tube is interposed between the pressure plate and the holding plate for selectively applying pressure to the driver plates. To ease assembly of the clutch, selected teeth on hub extend substantially over an uncompressed length X to the extent that the outermost driver plate is provided with minimum sufficient contact to align the plate on the teeth before the holding plate is secured to the hub. Uncompressed length X is defined as the distance from an inner surface of the flange to an inner surface of the outermost driver plate before the driver plates are compressed.

18 Claims, 3 Drawing Sheets

CLUTCH

TECHNICAL FIELD

The present invention relates to improvements in a disk clutch mechanism. More particularly, this invention relates to a pneumatic air disk clutch used in power transmission.

BACKGROUND OF INVENTION

A disk clutch typically comprises a drive hub, a driven plate and a pair of driver plates concentrically disposed about the hub, a back plate and a holding plate to capture the driver and driven plates on the hub, and an actuator that causes the driver plates to hold the driven plate. The clutch operates on the friction force that develops when the driven plate is held between the two driver plates. A common method of attaching the driver plates to the drive hub is by means of a plurality of splines. Proper alignment of the driver plates along the splines on the drive hub is critical to a properly functioning clutch. In large torque applications, a series of driver and driven plates are employed. As the number and weight of the individual plates increase, however, so does the difficulty of assembling the clutch.

In applications where in place assembly may be required, it is of particular importance to be able to assemble a clutch quickly and with minimal assistance. In large torque applications, for instance in an oil drilling operation, the driver plates can weigh ninety (90) pounds each. The holding plate, which captures the driver plates and driven plates on the drive shaft, can weigh one hundred and seventy (170) pounds or more. In view of the weight of the clutch's component parts, alignment of the driver plates on the splines of the drive hub while maneuvering the holding plate and various intermediate components is not easy.

SUMMARY OF THE INVENTION

A pneumatic air clutch assembly is provided which includes: an annular hub having a longitudinally extending passage for receiving a drive shaft and a flange back plate, a first plurality of spline teeth extending outwardly from the hub, a plurality of floating driver plates that engage the spline teeth, and a holding plate secured to the hub to capture the driver plates between the holding plate and the flange. An annular driving ring is concentrically disposed about the driver plates and includes a second plurality of longitudinally extending spline teeth. The second plurality of spline teeth engage a plurality of spaced friction plates that are positioned between the driver plates.

To apply pressure to the driver plates, an annular pressure plate is interposed between the holding plate and an outermost driver plate. Additionally, an annular air tube is interposed between the pressure plate and the holding plate for selectively applying pressure to the pressure plate, which in mm applies pressure to the driver plates and friction plates. As the driver plates and friction plates are pushed together, sufficient friction forces develop between the plates to cause the friction plates to impart rotary motion to the driving ring. The air robe includes an inlet with a valve for inflating or deflating the air robe that extends outwardly through an opening provided in the holding plate.

The driver plates are biased in a spaced relationship by a plurality of springs interposed between the back plate and a first driver plate and between the subsequent driver plates. The springs are captured in recesses formed in the driver plates and in the back plate.

To ease the alignment and assembly of the clutch, a selected group of the first plurality of spline teeth are extended over an uncompressed bias distance. The uncompressed bias distance is defined as the axial length of the driver plates as measured from the inner surface of the flange to the inner surface of the outermost driver plate before the springs are compressed by the holding plate during assembly of the clutch. The selected spline teeth extend substantially over the uncompressed bias distance of the driver plates to the extent that the outermost driver plate is provided with minimum sufficient contact to align the plate on the extended teeth.

BRIEF DESCRIPTION OF THE DRAWING

The accompanying drawings are incorporated into and form a part of the specification to illustrate several examples of the present invention. These drawings together with the description serve to explain the principles of the invention. The drawings are only for the purpose of illustrating preferred and alternative examples of how the invention can be made and used and are not to be construed as limiting the invention to only the illustrated and described examples. The various advantages and features of the present invention will be apparent from a consideration of the drawings in which.

DESCRIPTION OF PREFERRED EMBODIMENTS

Figure 1:
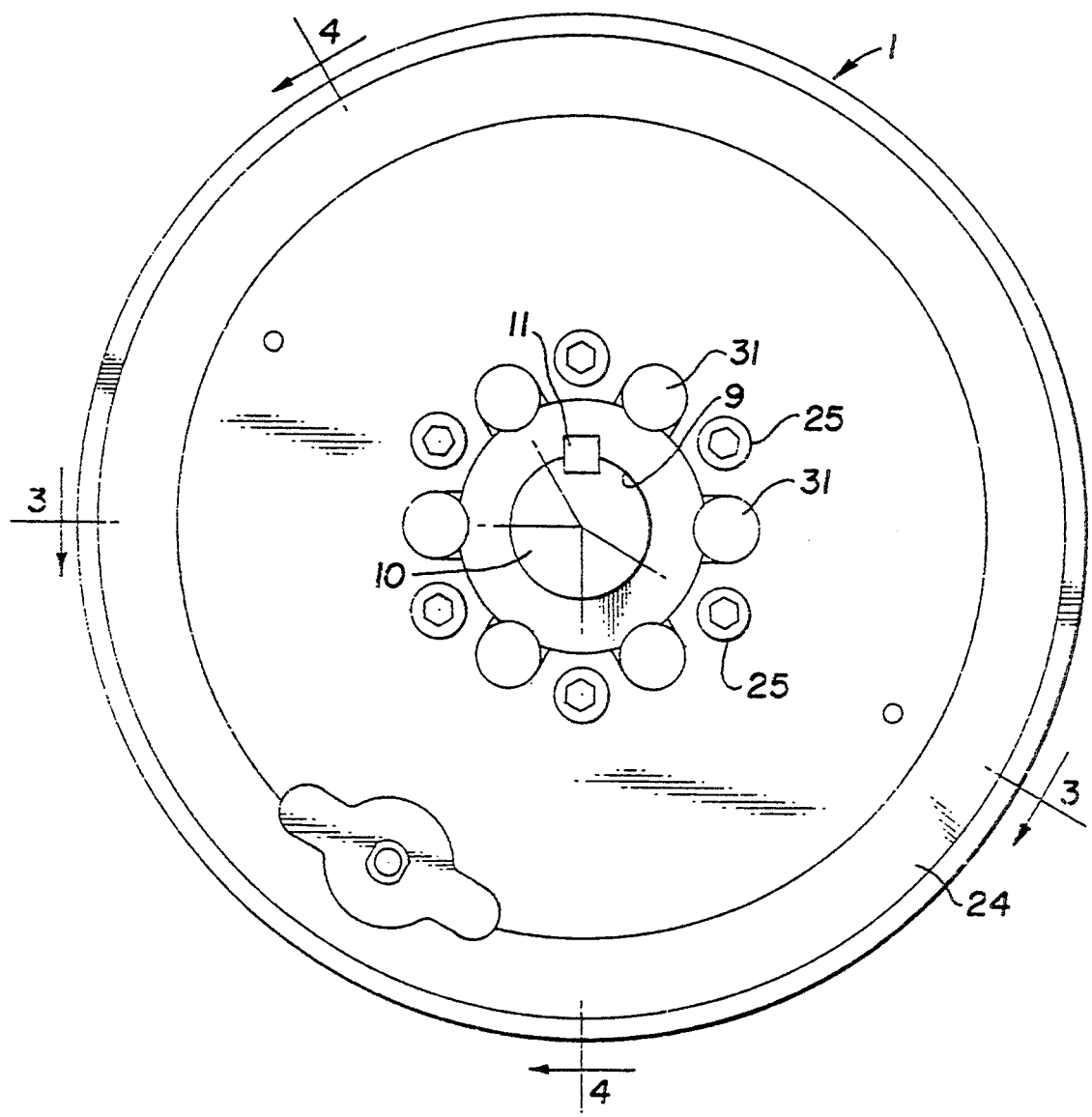
FIG. 1 is a top plan view of the pneumatic air clutch assembly according to the present invention.
Figure 2A:
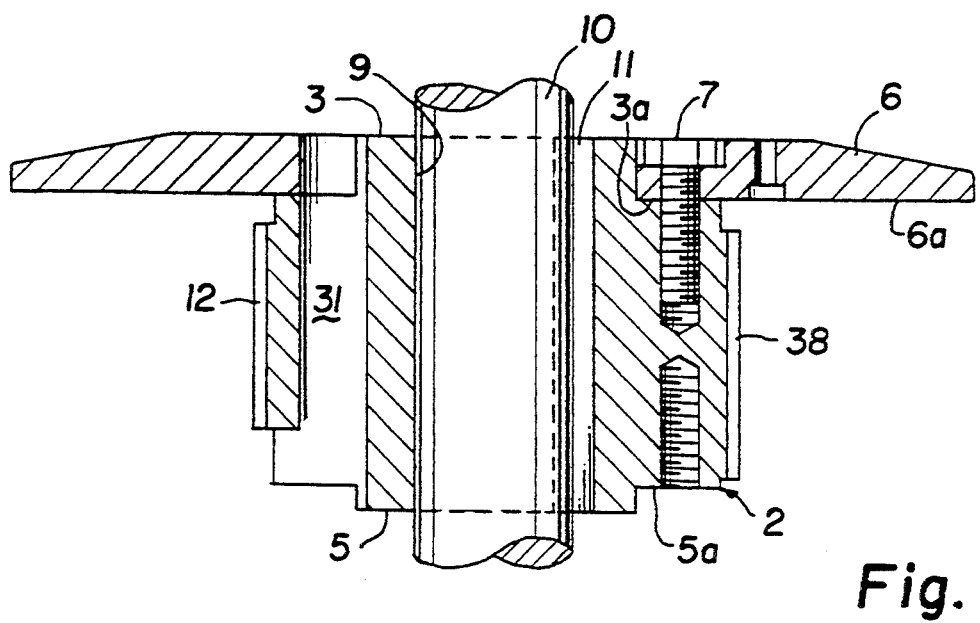
FIG. 2 is a bottom plan view of the pneumatic air clutch hub.
Figure 2:
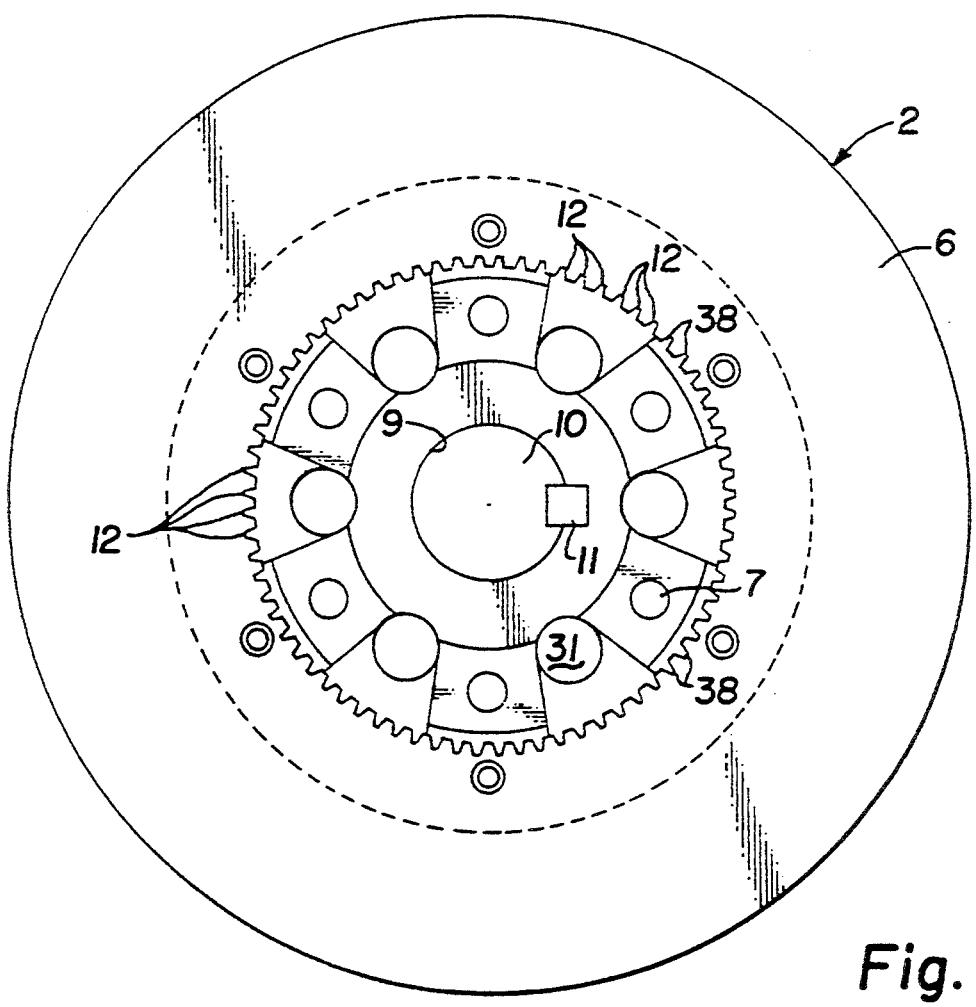

The present invention will be described by referring to apparatus showing various examples of how the invention can be made and used. Like reference characters are used throughout the several views of the drawing to indicate like corresponding parts.

Referring to FIGS. 1–4, the numeral 1 generally designates a pneumatic air clutch assembly. Pneumatic air clutch assembly 1 comprises an annular hub 2 having a first end 3 and a second end 5. First end 3 includes a shoulder 3a and a back flange plate 6. Flange 6 has a substantially flat annular surface 6a and is secured to shoulder 3a of first end 3 by threaded fasteners 7. Second end 5 comprises a cylindrical wall 8 that defines a longitudinally extending passage 9 for receiving a drive shaft 10. Drive shaft 10 imparts rotary motion or is imparted with rotary motion through a key 11 in cylindrical wall 8. Cylindrical wall 8 includes a shoulder 5a and a plurality of longitudinally extending spline teeth 12 that project outwardly in a radial fashion from the cylindrical wall 8. A plurality of spaced floating circular driver plates 13, 14, and 15 engage teeth 12 and are concentrically disposed about the cylindrical wall 8. Floating driver plates 13, 14, and 15 are slideably disposed on teeth 12, fixed in a radial fashion but free to slide up and down the longitudinal axes of teeth 12.

Thus, driver plates 13, 14, and 15 are slidable axially of hub 2.

An annular driving ring 18 is concentrically disposed about the circumference of driver plates 13, 14, and 15 for imparting rotary motion to a piece of equipment. It should be noted, however, that rotary motion can be imparted to the equipment either through the shaft 10 or though the driving ring 18. Driving ring 18 includes a second plurality of longitudinally extending spline teeth 19 and a means to secure the driving ring 18 to equipment (not shown).

The second plurality of teeth 19 face inwardly toward driver plates 13, and 15 to engage a plurality of spaced circular friction driven plates 20, 21, and 22 that are concentrically disposed about cylindrical wall 8 in a spaced relationship. Friction plates 20, 21, and 22 are fixed in a radial fashion but are free to slide up and down the longitudinal axes of the teeth 19. Friction plates 20, 21, and 22 are interposed between driver plates 13, 14, and 15, with friction plate 20 positioned between back flange plate 6 and a first driver plate 13, friction plate 21 positioned between the first driver plate 13 and a second driver plate 14, and friction plate 22 positioned between the second driver plate 14 and a third driver plate 15.

Figure 3:
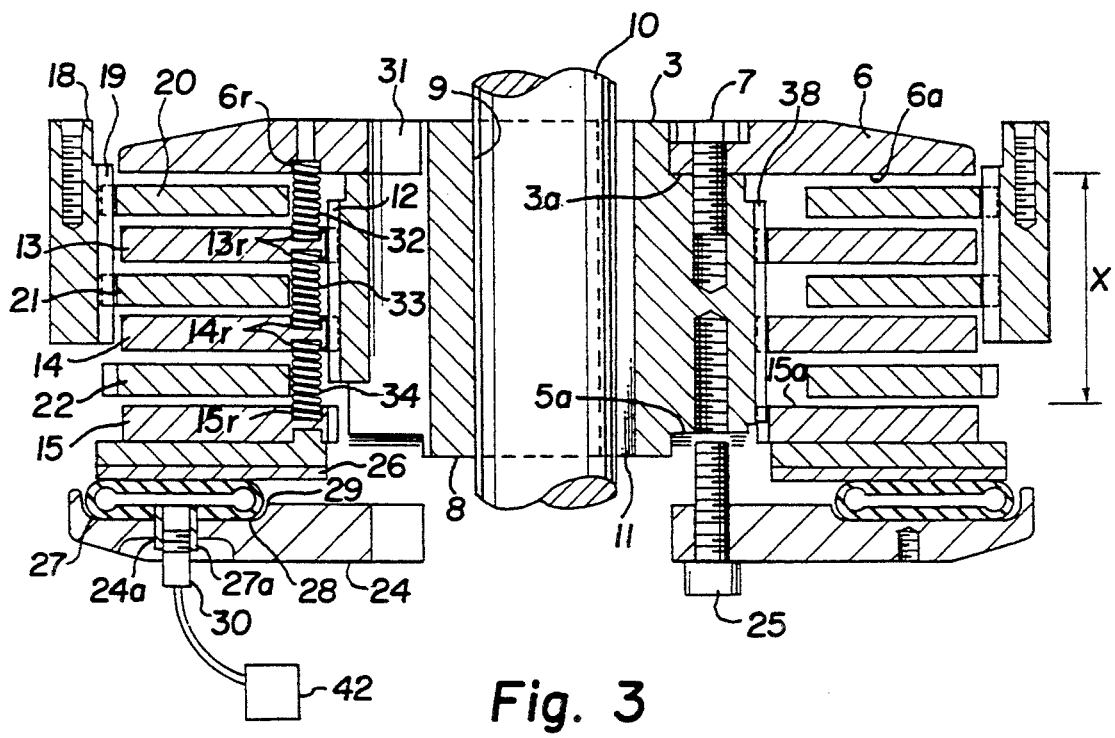
FIG. 3 is a cross-sectional view of the pneumatic air clutch assembly taken along line 3—3 in FIG. 1 illustrating the clutch assembly with the threaded fasteners untorqued.
Figure 4:
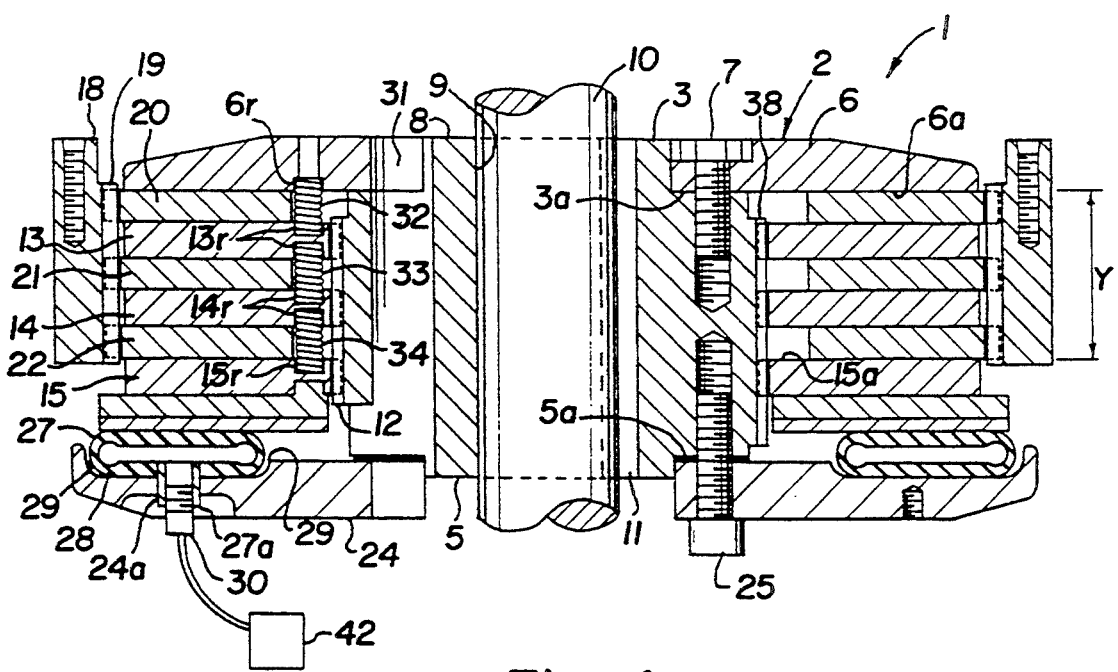
FIG. 4 is a cross-sectional view of the pneumatic air clutch assembly taken along line 4—4 in FIG. 1 illustrating the clutch with the threaded fasteners tightened.

As best illustrated in FIGS. 3 and 4, the driver plates 13, 14, and 15 and friction plates 20, 21, and 22 are captured on the hub 2 by an annular holding plate 24. Annular holding plate 24 is secured to the shoulder 5a of hub cylindrical wall 8 by threaded fasteners 25. An annular circular pressure plate 26 is interposed between annular holding plate 24 and outermost driver plate 15 to apply pressure to the driver plates 13, 14, and 15 and friction plates 20, 21, and 22. Annular pressure plate 24 is concentrically disposed about cylindrical wall 8. In addition, an inflatable tubular ring 27 is interposed between the pressure plate 26 and the holding plate 24 for selectively applying pressure to the driver plates 13, 14, and 15 and friction plates 20, 21, and 22. Holding plate 24 includes an annular recess 28 with vertically extending sides 29 to confine air tube 27 between holding plate 24 and pressure plate 26. Air tube 27 is inflated through inlet 27a and valve 30 which extend outwardly through an opening 24a in the holding plate 24. A pneumatic medium 42 is used to inflate tube 27.

When air tube 27 inflates, driver plates 13, 14, and 15 are pushed down the hub 2. As the driver plates 13, 14, and 15 push against the flange 6 of the hub, friction plates 20, 21, and 22 are held tightly between the driver plates. When the friction plates 20, 21, and 22 are held tightly between the driver plates 13, 14, and 15 friction forces develop between the respective plates which allow the friction plates to impart the rotary motion of the driver plates to the driving ring 18. However, these friction forces generate heat and can cause warpage in the driving plates and friction plates. To dissipate this heat, hub 2 includes cooling air passages 31. Cooling passages 31 extend through flange back plate 6, hub cylindrical wall 8, and holding plate 24 to provide an unobstructed air path through clutch assembly 1. The number and size of the cooling air passages 31 may be increased or decreased as the need arises.

As best illustrated in FIG. 3, driver plates 13, 14, and 15 are biased in a spaced relationship by a plurality of springs 32, 33, and 34 before fasteners 25 are torqued to seat annular holding plate 24 on shoulder 5a. Spring 32 is captured between back plate 6 and driver plate 13 in recesses 6r and 13r. Spring 33 is captured in recesses 13r and 14r in driver plates 13 and 14, respectively. Likewise, spring 34 is captured between recesses 14r and 15r in driver plates 14 and 15, respectively.

To ease alignment and assembly of the clutch 1, a selected group 38 of the first plurality of spline teeth 12 extend over the driver plates' uncompressed axial length, X. As best shown in FIG. 4, where holding plate 24 is shown in an unseated position, the uncompressed axial length of the driver plates, X, is defined as the distance from an inner surface 6a of the flange 6 to an inner surface 15a of outermost driver plate 15 when the springs 32, 33 and 34 are uncompressed and the driver plates are biased in a spaced relationship. The selected spline teeth 38 extend substantially over the uncompressed axial length X to the extent that the outermost driver plate 15 is provided with minimum sufficient contact to align plate 15 on extended teeth 38 before the driver plates 13, 14, and 15 are compressed by the pressure plate 26 when fasteners 25 are torqued to move plate 24 to a seat position. To prevent obstruction of cooling passageways, teeth 12 in the vicinity of cooling passageways are limited to the fully compressed axial length, Y, as shown on FIG. 4. The compressed axial length, Y, is defined as the distance from the inner surface 6a of back plate 6 to the inner surface 15a of the outermost driver plate 15 when springs 32, 33, and 34 are fully compressed after holding plate 24 is seated.

It can be appreciated that in place assembly of the clutch is difficult. The holding plate 24 typically weighs approximately one hundred and seventy (170) pounds or more, and driver plates 13, 14, and 15 each weigh approximately ninety (90) pounds or more. To assemble the clutch 1, driver plates 13, 14, and 15 have to be lined up on the spline teeth 18, and then pressure plate 26, tubular ring 27 and holding plate 24 have to be aligned around the hub 2, while retaining springs 32, 33, and 34 in recesses 6r, 13r, 14r, and 15r. In view of the weight of the component parts of the clutch assembly 1, it can be appreciated that alignment of the driver plates 13, 14, and 15 on the splines 12 of the hub 2 while maneuvering the holding plate and various intermediate components is not an easy task. Selected spline extensions 38 will allow alignment of the outermost driver plate 15 on splines 38 before the pressure plate 26, tubular ring 27, and holding plate 24 are fit-up for installation over driver plates 13, 14, and 15. Furthermore, pressure plate 26, tubular ring 27 and holding plate 24 can be installed over the driver plates 13, 14, and 15 without an excess of cumbersome equipment. Therefore, the step of positioning the holding plate 24 and securing it to the hub 2 by torquing of threaded fasteners 25, is significantly improved and requires far less equipment than was used in the past. Additionally, only a selected group 38 of the spline teeth 12 are extended, leaving the cooling air passages 31 unobstructed so that airflow in the clutch assembly 1 will not be impaired.

Once the clutch 1 is assembled, air tube 27 is selectively inflated through inlet 27a and valve 30 to exert pressure on driver plates 13, 14, and 15 and friction plates 20, 21, and 22. As the pressure on the driver plates and friction plates is increased, friction forces between the driver plates and friction plates are sufficient to allow the friction plates to transmit rotary motion to the driving ring 18.

It should be understood that clutch assembly 1 can be powered either through drive shaft 11, as described above, or through driving ring 18. If powered by the driving ring 18, the friction forces that develop between the driver plates and the friction plates allow the driver plates to impart rotary motion to the shaft 10.

Even though numerous characteristics and advantages of the present invention have been set forth in the foregoing description together with details of the structure and function of the invention, the disclosure is illustrative only. It should be understood that pneumatic air clutch assembly 1 can be used in many different applications requiring a wide range of torque ratings. In applications requiring a large torque rating, the number and/or diameter of the driver plates and the friction plates will increase. Likewise, in applications requiring a low torque rating the number and/or diameter of the driver plates and the friction plates may decrease. Various changes may be made in detail, especially in matters of shape, size, and arrangement of the parts, within the principles of the invention to the full extent indicated by the broad general meaning of the terms used. The restrictive description and drawings of the specific examples above do not point out what an infringement of this patent would be, but are to provide at least one explanation of how to make and use the invention. The limits of the invention and the bounds of the patent protection are measured by and defined in the appended claims.

What is claimed is:

1. A pneumatic air clutch assembly comprising:
   (a) a hub including a cylindrical wall and a flange at a first end of said cylindrical wall with a substantially flat annular surface, said cylindrical wall having a plurality of splines and defining a longitudinally extending passage for receiving and engaging a drive shaft;
   (b) a driver plate concentrically disposed about said cylindrical wall and splined to said cylindrical wall on said splines;
   (c) a driven element disposed between said flange and said driver plate;
   (d) a means to urge said driver plate toward said flange to frictionally engage said driven element;
   (e) a removable holding plate secured at a second end of said cylindrical wall for capturing said driver plate, driven element, and said means to urge said driver plates toward said flange on said hub, said holding plates being moveable between an unseated position defining an uncompressed axial length on said hub and a seated position defining a compressed axial length on said hub; and
   (f) at least one spline on said cylindrical wall extending substantially over said uncompressed axial length.

2. A pneumatic air clutch assembly according to claim 1 further including a pressure plate interposed between said holding plate and said driver plate, said pressure plate concentrically disposed about said cylindrical wall.

3. A pneumatic air clutch assembly according to claim 1 wherein said driver plate further includes a means to bias said driver plate in a spaced relationship with said flange.

4. A pneumatic air clutch assembly according to claim 3 wherein said means to bias said driver plate in a spaced relationship with said flange includes at least one spring captured between said flange and said driver plate.

5. A pneumatic air clutch assembly according to claim 2 wherein said means to urge said driver plate toward said flange includes:
   (a) an inflatable tubular member interposed between said pressure plate and said holding plate for selectively applying pressure to said driver plate; and
   (b) a means connectable with a pneumatic medium for selectively inflating said tubular member.

6. A pneumatic air clutch assembly to claim 1 further including a plurality of driver plates.

7. A pneumatic air clutch assembly according to claim 1 wherein said driven element comprises:
   (a) a driven plate disposed between said driver plate and said flange; and
   (b) a driving ring concentrically disposed about said driver plate having a second plurality of longitudinally extending splines facing inwardly toward said driver plate, said driven plate slideably disposed on said second plurality of splines.

8. A clutch assembly comprising:
   (a) a cylindrical wall having a longitudinally extending passage for receiving and engaging a drive shaft and a back plate at a first end of said cylindrical wall with a substantially flat annular surface;
   (b) a plurality of longitudinally extending splines on said cylindrical wall;
   (c) a floating plate concentrically disposed about said cylindrical wall and a splined to said cylindrical wall on said splines;
   (d) a driven plate disposed between said back plate and said floating plate;
   (e) a means to urge said floating plate toward said back plate to frictionally engage said riven plate;
   (f) a driving ring having a second plurality of splines, said driven plate being slideably disposed on said splines;
   (g) a removable annular holding plate secured at a second end of said cylindrical wall for capturing said floating plate and driven plate, said plate further being moveable between an unseated position defining an uncompressed axial length along said cylindrical wall and an unseated position defining a compressed axial length along said cylindrical wall; and
   (h) at least one extended spline on said cylindrical wall extending substantially over said uncompressed axial length.

9. A clutch assembly according to claim 8 further including a pressure plate interposed between said holding plate and said floating plate, said pressure plate concentrically disposed about said cylindrical wall.

10. A clutch assembly according to claim 9 wherein said means to urge said floating plate toward said back plate includes:
    (a) an inflatable tubular ring interposed between said pressure plate and said holding plate for selectively applying pressure to said floating plate; and
    (b) a means connectable to a pneumatic medium for selectively inflating said tubular ring.

11. A clutch assembly according to claim 8 wherein said driver plate further includes a spring captured between said back plate and said floating plate to bias said floating plate in a spaced relationship.

12. A clutch assembly according to claim 8 further including a plurality of floating plates.

13. A clutch assembly according to claim 12 further including a plurality of driven plates interposed between said plurality of floating plates.

14. A clutch assembly according to claim 10 wherein said means connectable to pneumatic medium includes an inlet in said ring and a valve, said valve extending outwardly from an opening provided in said holding plate.

15. A pneumatic air clutch assembly comprising:
   (a) a hub including a cylindrical wall and a flange at a first end of said cylindrical wall with a substantially flat annular surface, said cylindrical wall having a plurality of splines and defining a longitudinally extending passage for receiving and engaging a drive shaft;
   (b) a driver plate concentrically disposed about said cylindrical wall and splined to said cylindrical wall on said splines;
   (c) a driven element disposed between said flange and said driver plate;
   (d) a means to urge said driver plate toward said flange to frictionally engage said driven element;
   (e) a removable holding plate secured at a second end of said cylindrical wall for capturing said driver plate, driven element, and said means to urge said driver plates toward said flange on said hub, said holding plate further being moveable between an unseated position defining an uncompressed axial length on said hub and a seated position defining a compressed axial length on said hub; and
   (f) a plurality of splines on said cylindrical wall extending substantially over said uncompressed axial length.

16. A clutch assembly comprising:
   (a) a cylindrical wall having a longitudinally extending passage for receiving and engaging a drive shaft and a back plate at a first end of said cylindrical wall with a substantially flat annular surface;
   (b) a plurality of longitudinally extending splines on said cylindrical wall;
   (c) a floating plate concentrically disposed about said cylindrical wall and splined to said cylindrical wall on said splines;
   (d) a driven plate disposed between said back plate and said floating plate;
   (e) a means to urge said floating plate toward said back plate to frictionally engage said driven plate;
   (f) a driving ring having a second plurality of splines, said driven plate being slideably disposed on said splines;
   (g) a removable annular holding plate secured at a second end of said cylindrical wall for capturing said floating plate and driven plate, said plate further being moveable between an unseated position defining an uncompressed axial length along said cylindrical wall and an unseated position defining a compressed axial length along said cylindrical wall; and
   (h) a plurality of splines on said cylindrical wall extending substantially over said uncompressed axial length.

17. A pneumatic clutch assembly according to claim 16 further including at least one air passageway formed in said cylindrical wall, back plate, and holding plate for cooling of said clutch assembly.

18. A pneumatic clutch assembly according to claim 17 wherein said extended splines are provided adjacent said air passageway.

* * * * *

UNITED STATES PATENT AND TRADEMARK OFFICE
CERTIFICATE OF CORRECTION

PATENT NO. : 5,439,083
DATED : AUGUST 8, 1995
INVENTOR(S) : BROCK ET AL.

It is certified that error appears in the above-indentified patent and that said Letters Patent is hereby corrected as shown below:

Column 1, line 58, "mm" should be -- turn --;

Column 1, line 63, "robe" should be -- tube --;

Column 1, line 64, "robe" should be -- tube --; and

Signed and Sealed this

Twenty-eighth Day of November 1995

BRUCE LEHMAN

Attest:

Attesting Officer

Commissioner of Patents and Trademarks